United States Patent [19]
Kanani et al.

[11] 3,878,093
[45] Apr. 15, 1975

[54] SEPARATING YEAST AND/OR BACTERIAL CELLS FROM A LIQUID MEDIUM

[75] Inventors: Diamond Pirbhai Kanani; Peter John Sherrington; David Charles Steer, all of Stockton-on-Tees, England

[73] Assignee: Imperial Chemical Industries Limited, London, England

[22] Filed: Feb. 23, 1973

[21] Appl. No.: 335,109

[30] Foreign Application Priority Data
Mar. 3, 1972 United Kingdom.................. 9981/72

[52] U.S. Cl.................... 210/51; 210/56; 195/28 R; 195/104; 260/112 R; 424/204
[51] Int. Cl. ................................................ A23j 1/00
[58] Field of Search....... 195/28 R, 104; 260/112 R; 424/204

[56] References Cited
UNITED STATES PATENTS
3,781,264  12/1973  Akin .............................. 260/112 R

*Primary Examiner*—Lionel M. Shapiro
*Attorney, Agent, or Firm*—Cushman, Darby & Cushman

[57] ABSTRACT

A method for separating bacterial cells from an aqueous medium wherein the cells are flocculated by treating the medium with an alkali to raise its pH to a value within the range 8 to 11 and/or heating the medium to a temperature within the range 50° to 200°C and thereafter treating the medium with an acid to lower its pH to a value within the range 2 to 5. The flocculated cells may be separated by e.g. settling or flotation.

9 Claims, No Drawings

SEPARATING YEAST AND/OR BACTERIAL CELLS FROM A LIQUID MEDIUM

This invention relates to a method for separating bacterial cells from a liquid medium containing them.

In a process for producing a protein composition by growing bacteria upon an aqueous nutrient medium comprising an assimilable carbon source, the initial product is an aqueous suspension comprising bacterial cells.

Various solid-liquid separation techniques may be used to separate the bacterial cells from the suspension. For example, in some cases the suspension may be flocculated by addition of a flocculating agent, and the flocculated cells allowed to separate from the liquid in settling tanks. After settling the cells may be further concentrated by centrifugation and then dried to give, as a final product, dried bacterial cells.

In many cases the rate of settling of flocculated cells achievable by the separation described above is extremely slow. This is because the flocs obtained tend to be small and loose, i.e. the amount of liquid medium retained within the flocs is high and the difference between the densities of the flocs and the medium is small. Also the strength of the flocs is insufficient to permit separation by other separation techniques such as filtration or flotation and their behavior during subsequent centrifugation shows little improvement compared with the original suspension. In practice therefore the only advantage attainable by such a separation process in many cases is the removal of a proportion of the medium by settling and, in view of the low settling rates which can be achieved, it is difficult to make this stage of the separation method economical when operated upon a large scale.

According to the present invention we provide a method for separating bacterial cells from an aqueous medium wherein the cells are flocculated, by subjecting the medium to at least one of the steps of:

A. raising the pH of the medium to a value within the range 8 to 11 by treatment with an alkali, and
B. heating the medium to a temperature within the range 50° to 200°C;

followed by the step of lowering the pH to a value within the range of 2 to 5 by treatment with an acid, and the flocculated cells are separated from the medium.

It is believed that steps (A) and (B) cause structural changes to occur in the walls of the bacterial cells which enable the cells to be flocculated by the method of the invention. The method is very suitable for separating bacterial cells of strains of the genera Pseudomonas, Alcaligenes, Arthrobacter, and Bacillus, for example strains of the species *Pseudomonas fluorescens, Pseudomonas aeroginosa, Pseudomonas diminuta, Alcaligenes faecalis, Bacillus cereus* and, particularly, *Pseudomonas methylotropha* (a species whose characteristics are described in our co-pending U.K. Applications Nos. 58466/70 and 38938/71 — corresponding to U.S. application Ser. No. 203061 now, abandoned in favor of a continuation thereof Ser. No. 416,098, and French Specification No. 2,117,530). Cultures of a number of strains of this last species have been deposited in the National Collection of Industrial Bacteria, Torrey Research Station, Aberdeen, Scotland, U.K. and corresponding deposits have been made in the collections of the U.S. Department of Agriculture at Peoria, Ill. and the Fermentation Research Institute, Japan. The numerical designations given to these cultures are as follows:

NCIB NOS. 10508–15 and 10592–6
NRRL NOS. B. 5352–64
FRI NOS. 1215–27

The method of the invention is particularly suitable for separating cells of these strains and natural or artificially derived mutants thereof from aqueous media.

In the method of the invention the medium may be subjected to either one of steps (A) and (B) without the other or it may be subjected to both steps. In this last case it is preferred that step (A) precedes step (B). If only one of steps (A) and (B) is to be performed it is preferably (B).

Whilst the method is applicable generally to separation of bacterial cells from suspension in liquid media and can be applied as a batch or continuous process, it is particularly suitable for the continuous separation of bacterial cells as a step in a biomass (single cell protein) production process, e.g. in a process such as that of co-pending U.K. Application Nos. 58466/70 and 38938/71. When used as a step in a continuous biomass production process, the method may conveniently be operated by passing the initial product of the process, whose pH will usually be about 6.8, through a system comprising in sequence, means for adding an alkali, a heat exchanger for raising the temperature, a cooler and means for adding acid, into a stirred tank. It is not necessary for all the elements of the system to be operational during any particular separation.

When alkali treatment step (A) is employed, the pH is preferably raised to a value within the range 8 to 9, for example 8.5. If heating step (B) is omitted a higher pH is preferred. The period during which the medium is maintained at an alkaline pH before treatment with acid may vary over a wide range but is preferably up to 30 mins especially 0.5 to 10 mins. The period may be very short, e.g. in the system described above it will be the time taken for medium to proceed from the alkali addition to the acid addition stage. For pH values within the range 8 to 9, the preferred alkali is ammonia in aqueous solution, e.g. a 1:6 $NH_4OH:H_2O$ solution. For pH values in the range 9 to 11, sodium hydroxide is preferred. Other alkaline compounds which may be used include the hydroxides of potassium and calcium.

During heat treatment step (B) the temperature of the medium is preferably raised to 70° to 90°C, in a continuous process 80° to 85°C is especially suitable. The period during which the medium is maintained at a higher temperature before acid treatment may vary over a wide range but is preferably up to 30 minutes, especially 0.5 to 5 minutes. The period may be very short, the medium being subjected to "flash" heating, i.e. being rapidly raised to the required temperature on passing through a heat exchanger and being maintained at that temperature for a very short period, e.g. less than 0.5 minutes. In the continuous system described above a number of alternative paths may be provided for the medium after it leaves the heat exchanger. It may pass directly to the acid treatment stage or may take other more circuitous routes which result in the medium being maintained at a higher temperature for selected periods e.g. 1, 2 or 3 minutes. When the medium is delayed in this way during its passage between the heat treatment and acid treatment steps the temperature will fall to some extent after leaving the heat exchanger e.g. from 80° to 73°C.

After heat treatment the medium may be cooled before treatment with acid. This is preferred if the flocculated cells are eventually to be separated by settling but not if a flotation method is to be used. If a cooling step is included the medium is preferably cooled to ambient temperature. However temperatures within the broad range 20° to 50°C, particularly 20° to 30°C are suitable.

During the acid treatment step the pH is preferably reduced to a value within the range 2.5 to 4.5 to cause the bacterial cells to separate from the medium in large flocs. Especially suitable pH ranges are 3 to 3.5 if the flocculated cells are eventually to be separated by settling and 3.5 to 4.5 if they are eventually to be separated by flotation. The acid used may suitably by sulphuric, hydrochloric or phosphoric acid or an acid gas such as carbon dioxide or sulphur dioxide. When the method forms a step in a biomass production process the acid is preferably a phosphoric/sulphuric acid mixture of suitable proportions to enable the medium, after separation of the flocculated cells, to be recirculated to the fermentation stage of the process. After treatment with acid, the medium is preferably stirred while the flocs develop.

The method of the invention enables large, strong flocs to be produced and a good rate of settling to be achieved. The flocs produced may vary in size over a wide range depending upon the rate of stirring and upon the strain of bacteria, for example the diameters may be in the range 0.1 mm to 1.0 cm.

The acid treatment step may be followed by the steps of settling or flotation, centrifugation, filtration or evaporation and drying to obtain dried cells as the final product of a fermentation process. Use of the method enables the size of the settling tanks and the number of centrifuges employed in separating the bacterial cells produced in a fermentation process to be reduced.

During the production of bacterial cells by fermentation processes, a proportion of the protein content of the cells produced passes into solution in the liquid medium. When the cells are separated from the medium by conventional flocculation techniques, the protein in solution passes into the supernatant liquor in the settling tank and is lost. Using the method of the invention some of the protein in the medium is rendered insoluble by the acid treatment step and is recovered.

The invention is illustrated by the following Examples:

EXAMPLE 1

Six litres of a suspension containing 8g/l dry weight of Pseudomonas methylotropha str. NCIB 10593 were taken from a carbon limited steady state continuous culture. The suspension was divided into six separate 1 litre samples (A to F) and the pH of 5 of these (A and C to F) was raised to 8.5 by addition of aqueous ammonia. Samples B to F were heated to selected temperatures at which they were maintained for selected periods, being thereafter cooled to 22°C. The pH of all samples was reduced to 3.5 by addition of sulphuric acid causing flocculation of the cells. After acid treatment the samples were transferred to 1 litre graduated cylinders in such a way as to ensure thorough mixing. The initial rate of descent of the interface between the flocculated material and the supernatant liquor was timed and the concentration of the material accumulated at the bottom of the cylinders after 16 hrs. was measured.

The results are shown in Table 1.

In small scale tests the reproducibility of settling rates is reduced due to differences in specific gravities of culture media and to production of gas bubbles which reduce the rate of settling of flocs. Thus in some cases the settling rate gives an inadequate indication of the extent of flocculation. Therefore in Examples 1 and 2 a qualitative description of the extent of flocculation has also been adopted based upon visual appraisal of the size and strength of the flocs formed. In Tables 1 and 2 the extent of flocculation is indicated by the following symbols:

0 — No flocculation
+ — Slight flocculation
++ — Extensive production mainly small, light flocs with satisfactory settling properties.
+++ — Extensive production of large, strong flocs with very good settling properties.
N.B. — With sample A step (B) was omitted whilst with sample B step (A) was omitted. Samples C to F were subjected to both steps (A) and (B).

TABLE 1

| Sample | Temp. after heating(°C) | Time at temp. (mins) | Initial Settling rate (cm/hr) | Final concn. after 16 hr (g/l) | Degree of flocculation |
|---|---|---|---|---|---|
| A | — | — | 2 | 4 | + |
| B | 70 | 5 | 93 | 48 | ++ |
| C | 70 | 2 | 372 | 84 | +++ |
| D | 70 | 5 | 392 | 55 | +++ |
| E | 85 | 2 | 450 | 52 | +++ |
| F | 85 | 5 | 354 | 65 | +++ |

EXAMPLE 2

In separate experiments samples of suspensions containing approximately 2.5 g/l dry weight of Pseudomonas fluorescens strain NCIB 9046, Pseudomonas diminuta strain NCIB 9393, Bacillus cereus strain NCIB 9373 and Acaligenes faecalis strain NCIB 8156 were taken from batch cultures. In each case four 500 ml samples (A–D) were taken and were treated as follows:

A — No treatment
B — pH adjusted to 3.5 using HCl.
C — pH adjusted to 10 using NaOH solution and after 15 minutes adjusted to 3.5 using HCl.
D — pH adjusted to 8.5 using NaOH solution, sample heated to 80°C for 1 min. and then cooled to ambient temperature and pH adjusted to 3.5 using HCl.

The initial settling rates and degree of flocculation measured as described in Example 1 are given in Table 2.

TABLE 2

| Bacterium | Sample | Initial Settling Rate (cm/hr) | Degree of flocculation | pH of medium on initial sampling |
|---|---|---|---|---|
| Pseudomonas Fluorescens | A | 0 | 0 | |
| | B | 60 | + | |
| | C | some flotation | ++ | 7.4 |
| | D | 110 | +++ | |
| Pseudomonas diminuta | A | 0 | 0 | |
| | B | 0 | + | |
| | C | 0 | + | 7.9 |
| | D | some flotation | ++ | |
| Bacillus Cereus | A | 0 | 0 | |
| | B | 0 | 0 | |
| | C | 150 | ++ | 4.3 |
| | D | 140 | ++ | |
| Alcaligenes Faecalis | A | 0 | 0 | |
| | B | 70 | + | |
| | C | 100 | ++ | — |
| | D | 110 | ++ | |

Depending upon the pH and heat treatment the flocs took various forms. The following types were identified: (i) very small, (ii) fine asbestos-fibre like, (iii) larger fibrous, (iv) slightly granular, (v) granular, (vi) gel balls.

Under certain conditions, the flocs were formed in a more gel-like state but still maintaining their shape. With poor mixing in the stirred tank, gel balls and flocs were formed. Increased stirring gave full flocculation whilst excessive stirring broke the flocs down.

Ideal flocs are large and have a high settling rate (rates in excess of 3000 cms/hr have been obtained). The most ideal flocs were (iii), (iv) and (v) above. Fine flocs tended to hang in the supernatant and gave relatively slow settling whilst gel balls consisted of unflocculated culture and were thus not ideal.

Examples of the results obtained under various conditions are given in Table 3.

TABLE 3

| Dry wt. of bacteria in medium (g/l) | pH after alkali addition | Temp. after heating (°C) | Residence time at elevated temp. (mins) | Cooling water | pH after acid addition | Temp. in stirred tank | Comments |
|---|---|---|---|---|---|---|---|
| 2.4 | no addition | 25 | 0 | off | 3.5 | 25 | no flocculation |
| 10.4 | 8.4 | 81.5 | 3 | on | 3.3 | 41 | large flocs good settling |
| 4.75 | no addition | 50 | 0 | on | 3.5 | not measured | fine flocs good settling |
| 4.75 | no addition | 60 | 0 | on | 3.5 | not measured | granular flocs. Clear supernatant |
| 6.5 | 8.7 | 85 | 3 | on | 3.4 | 32 | Flocs and gel balls quick settling |
| 6.5 | 8.7 | 85 | 0 | on | 3.4 | 32 | Flocs and gel balls quick settling |
| 6.0 | 8.5 | 80 | 3 | on | 3.5 | 32 | Large gel flocs clear supernatant |
| 6.0 | 8.5 | 75 | 0 | on | 3.0 | 32.5 | Large flocs quick settling |

EXAMPLE 3

A number of suspensions containing a *Pseudomonas methylotropha* strain were flocculated under differing conditions in a continuous flocculation apparatus. In the apparatus medium was pumped from a feed tank into a stirred tank, through a system comprising:
  a. An alkali introduction point.
  b. A heat exchanger wherein the tube carrying the medium passed through an oil bath.
  c. A system comprising several flow paths which enabled the medium to be maintained at an elevated temperature for various periods viz. a very short period (zero residence), 1 min., 2 mins and 3 mins.
  d. A cooler.
  e. An acid introduction point.

Means were provided for measuring pH after alkali and acid addition and for measuring the temperature of the medium both on leaving the heat exchanger and after acid addition. Alkali addition was made by introducing a 1:6, $NH_4OH:H_2O$ solution into the system. Acid addition was made by introducing a 1:1 mixture of 0.5 N $H_2SO_4$ and 0.5 N $H_3PO_4$ solutions into the system.

The extent and nature of flocculation and the clarity of the supernatant liquor achieved by the method were estimated visually.

EXAMPLE 4

Example 2 was repeated using 4 × 200 ml samples of a suspension containing approximately 8g/l dry weight of Pseudomonas aeroginosa strain NCIB 950 taken from a continuous culture. The pH at the time of sampling was 7.1. The results are given in Table 4.

TABLE 4

| Sample | Initial Settling rate cm/hr | Degree of flocculation |
|---|---|---|
| A | 0 | 0 |
| B | 0 | 0 |
| C | 40 | ++ |
| D | 110 | +++ |

EXAMPLE 5

Four 200 ml samples of a suspension containing approximately 5g/l dry weight of Arthrobacter Nov. strain NRRL B3728 were taken from batch culture. The pH at the time of sampling was 6.9. The four samples were treated as follows:

A — No treatment
B — Adjust to pH 3.5 using hydrochloric acid.

C — Adjust to pH 10 using sodium hydroxide solution, heat to 85°C for 5 minutes and adjust to pH 3.5 with hydrochloric acid.

The results are given in Table 5.

TABLE 5

| Sample | Initial Settling Rate cm/hr | Degree of Flocculation |
|---|---|---|
| A | 0 | 0 |
| B | 0 | 0 |
| C | some setting | ++ |

We claim:

1. A method for separating bacterial cells from an aqueous medium wherein the cells are flocculated, by heating the medium to a temperature within the range 50° to 200°C and thereafter lowering the pH of the medium to a value within the range 2 to 5 by treatment with an acid, and the flocculated cells are separated from the medium.

2. A method according to claim 1 wherein before the medium is heated the pH of the medium is raised to a value within the range 8 to 11 by treatment with an alkali.

3. A method according to claim 1 wherein the bacterial cells belong to a strain of a species selected from the group consisting of *Pseudomonas fluorescens*, *Pseudomonas diminuta*, *Alcaligenes faecalis*, *Pseudomonas Aeroginosa*, *Bacillus cereus*, *Pseudomonas methylotropha* and *Arthrobacter Nov* NRRL B 3728.

4. A method according to claim 3 wherein the strain is selected from the group consisting of strains NRRL B. 5352 to 5364 and naturally and artifically derived mutants of these strains.

5. A method according to claim 2 wherein the pH is raised to a value within the range 8 to 9.

6. A method according to claim 1 wherein said heating is at a temperature within the range 70° to 90°C.

7. A method according to claim 1 wherein after said heating the medium is cooled to a temperature within the range 20° to 30°C before being treated with the acid.

8. A method according to claim 1 wherein during the acid treatment step the pH is reduced to a value within the range 2.5 to 4.5.

9. A method according to claim 1 which forms a step in a process for the continuous production of biomass.

* * * * *